(12) United States Patent
Matthews

(10) Patent No.: US 10,027,187 B2
(45) Date of Patent: Jul. 17, 2018

(54) WIRELESS MESH ENERGY NETWORK

(71) Applicant: Jessica Osemudiamen Idoni Matthews, Poughkeepsie, NY (US)

(72) Inventor: Jessica Osemudiamen Idoni Matthews, Poughkeepsie, NY (US)

(73) Assignee: Uncharted Power, Inc., New York, NY (US)

( * ) Notice: Subject to any disclaimer, the term of this patent is extended or adjusted under 35 U.S.C. 154(b) by 183 days.

(21) Appl. No.: 15/218,621

(22) Filed: Jul. 25, 2016

(65) Prior Publication Data
US 2017/0025857 A1    Jan. 26, 2017

Related U.S. Application Data

(60) Provisional application No. 62/196,112, filed on Jul. 23, 2015.

(51) Int. Cl.
| | |
|---|---|
| H02J 1/10 | (2006.01) |
| H02J 50/80 | (2016.01) |
| H02J 50/40 | (2016.01) |
| H02J 50/20 | (2016.01) |
| H02J 7/02 | (2016.01) |
| H02J 50/10 | (2016.01) |
| H02J 50/30 | (2016.01) |
| H02J 50/15 | (2016.01) |

(52) U.S. Cl.
CPC ............. *H02J 50/80* (2016.02); *H02J 50/40* (2016.02); *H02J 7/025* (2013.01); *H02J 50/10* (2016.02); *H02J 50/15* (2016.02); *H02J 50/20* (2016.02); *H02J 50/30* (2016.02)

(58) Field of Classification Search
USPC ..................................................... 307/24, 51
See application file for complete search history.

(56) References Cited

U.S. PATENT DOCUMENTS

| | | | | |
|---|---|---|---|---|
| 2002/0176390 | A1* | 11/2002 | Sparr | .................... H04W 84/18 370/338 |
| 2002/0181427 | A1 | 12/2002 | Sparr et al. | |
| 2011/0153722 | A1* | 6/2011 | Choudhary | ......... H04L 67/2814 709/203 |
| 2011/0153937 | A1* | 6/2011 | Annamalaisami | ..... G06Q 10/10 711/118 |
| 2011/0277026 | A1* | 11/2011 | Agarwal | ................. G06F 21/41 726/8 |

(Continued)

*Primary Examiner* — Adam Houston

(57) ABSTRACT

An energy distribution system is provided with a plurality of energy harvesting devices and a plurality of power draining devices in a wireless mesh energy network. One or more of the energy harvesting devices wirelessly transmits electrical energy to one or more of the power draining devices to power the power draining devices. The energy harvesting devices have harvesting mechanisms that harness and converts kinetic energy of motion, mechanical energy or other forms of energy from other sources into electrical energy. The power draining devices are configured to communicate a signal requesting for power and power data to the energy harvesting devices. The energy harvesting devices utilize the power data to prioritize which power draining devices will wirelessly receive electrical energy. This system would decrease or eliminate the need for attachment to the energy grid.

25 Claims, 10 Drawing Sheets

(56) References Cited

U.S. PATENT DOCUMENTS

| | | | |
|---|---|---|---|
| 2011/0277027 A1* | 11/2011 | Hayton | H04L 63/0815 |
| | | | 726/8 |
| 2013/0007239 A1* | 1/2013 | Agarwal | H04L 63/02 |
| | | | 709/223 |
| 2017/0025857 A1* | 1/2017 | Matthews | H02J 50/40 |
| 2018/0034321 A1* | 2/2018 | Tole | H02J 50/12 |
| 2018/0041895 A1* | 2/2018 | Barcala | H04W 8/22 |
| 2018/0049000 A1* | 2/2018 | Holland | H04W 4/029 |
| 2018/0049017 A1* | 2/2018 | Shmidt | H04W 4/008 |

* cited by examiner

WIRELESS MESH ENERGY NETWORK

TECHNICAL FIELD

The present invention relates generally to systems and methods of distributing power, and more specifically to wireless mesh energy networks and electrical grids transmitting power dynamically between source nodes (e.g., energy harvesting devices, power generating devices) and destination nodes (e.g., power drawing devices, power draining devices).

BACKGROUND

U.S. Patent Application Publication No. 2002/0181427 is directed to a system and method of creating a wireless mesh network with nodes arranged in network neighborhoods and configured for over-the-air communication with one another. The network infrastructure is characterized by a communications architecture where a computer is configured with a transport protocol, a network protocol, a media access control protocol, and a first physical link layer, while a network node is configured with the network protocol, the media access control protocol, the first physical link layer, a channel access control protocol and a second physical link layer. Data is sent over a series of short hops and intermediate nodes in order to be carried over large distances. Only one node needs to be physically wired into a network connection, such as a DSL internet model. This configuration allows for a cloud of connectivity to be established and provides increased bandwidth necessary to transmit multimedia content.

However, such a system and other conventional systems are not configured to transmit and/or distribute electrical power wirelessly from one or more source nodes (e.g., energy harvesting devices, energy generating devices) to one or more destination nodes (e.g. energy draining devices, loads) in order for the destination node(s) and/or devices located at the destination node(s) to be powered and/or charged. Further, conventional systems are not configured to allocate and transmit electrical power wirelessly in a wireless energy network having incoming and outgoing source nodes and destination nodes.

Accordingly, there is a need for a system and method of allocating and distributing electrical power between devices via a wireless mesh energy network.

SUMMARY

The needs set forth herein as well as further and other needs and advantages are addressed by the present embodiments, which illustrate solutions and advantages described below.

An objective of the present invention is to remedy the above problems associated with conventional networks. The present invention provides a system and method for dynamically allocating and distributing electrical power between one or more source nodes (e.g., energy harvesting devices, energy generating devices) and one or more destination nodes (e.g. power draining devices, power drawing devices) via a wireless mesh energy network.

It is another objective to provide a system and method for intelligent allocation and transmission of power between one or more source nodes and one or more destination nodes utilizing power data (e.g., power level, battery status, voltage, current, charging rate, discharging rate, etc.) and identity of the nodes and/or devices associated with the nodes.

It is a further objective to provide a system and method for prioritizing the allocation and transmission of electrical power from one or more source nodes to one or more destination nodes via a wireless mesh energy network.

It is an additional objective to provide a system and method for distributing electrical power wirelessly from one or more source nodes to one or more destination nodes using directional transmission. It is also an objective to provide a system and method for distributing electrical power wirelessly from one or more source nodes to one or more destination nodes using omnidirectional transmission.

These and other objectives are achieved by providing a wireless mesh energy network system, and related method, having at least one energy harvesting device and at least one power draining device communicatively connected to one another via a wireless network, wherein the energy harvesting device is configured to harvest and/or generate electrical energy and includes a power transmitter to wirelessly transmit the electrical energy to the power draining device upon receiving a request for power from the power draining device. Both the energy harvesting device and the power draining device have a transceiver to communicate with one another, and in particular, the transceiver of the power draining device sends a "request for power" signal and its power data to the energy harvesting device. The transceivers of the energy harvesting device and the power draining device may be configured to periodically send messages to one another to provide notification of their presence within the wireless network. Since other energy harvesting devices and/or power draining devices may enter or leave the wireless network, it is beneficial for all nodes (i.e., energy harvesting devices and power draining devices) to know who is currently present in the network. For example, a power draining device can be a mobile device (e.g., laptop, mobile phone, tablet, PDA, watches, etc.) coming in or out of range of the wireless network.

The nodes (i.e., energy harvesting devices and power draining devices) within the wireless network may be configured for one of or a combination of broadcasting, point-to-point communication and multicasting. With a broadcast configuration, a communications signal is transmitted without singling out any particular target recipient node among a potential audience of one or more recipient nodes. Point-to-point communication establishes a direct connection between two nodes, wherein a communications signal is sent by singling out a particular target recipient node among an audience of one or more recipient nodes. In the embodiments where multicasting is used, group communication is provided, wherein information is addressed to a group of recipient nodes. Multicasting provides for transmission by singling out a group of particular recipient nodes among a potential audience of recipient nodes.

Communication between energy harvesting devices and power draining devices may be achieved using one or more wireless communication technologies. For example, the transceivers of both devices may utilize Bluetooth technology to exchange data from fixed and mobile devices. The transceivers may utilize ANT technology, which defines a wireless communications protocol that enables hardware operating in, for example the 2.4. GHz band, to communicate under standard rules for coexistence, data representation, signaling, authentication and/or error detection. With ANT-based transceivers, the energy harvesting devices and the power draining devices are capable of determining when to transmit based on the activity of its neighbors. In another example, the transceivers may utilize ZigBee technology such that network communication is established with radios using radio waves. Other wireless communication technologies may be implemented in the wireless mesh energy network system and the present teachings are not limited to the specific technologies shown and described herein.

In some embodiments, there may be more than one energy harvesting device within the wireless network. In some embodiments, there may be more than one power draining device within the wireless network. In still other embodiments, the network contains multiple energy harvesting devices and multiple power draining devices.

An energy harvesting device may itself operate as a power draining device after providing electrical energy to another device. In some embodiments, the energy harvesting device is configured so that it adjusts operation immediately after it finishes transmitting electrical energy. In other embodiments, whether the energy harvesting device changes configuration is dependent on its power state after it completes transfer of electrical energy to another device. If the power state of the energy harvesting device is above a predetermined threshold, the energy harvesting device continues energy harvesting operations. If the power state drops below the predetermined threshold, then the energy harvesting device switches functions to that of power draining, wherein it can proceed with requesting and receiving electrical energy from another source (i.e., another energy harvesting device). For example, when the predetermined threshold is set at 50% power, the energy harvesting device continues to perform energy harvesting functions as long as its power state is greater than 50%. However, when its power state drops below 50%, the energy harvesting device performs power draining functions. The predetermined threshold value may be set to any value between 10% and 60%.

Further objectives are achieved by providing a wireless mesh energy network system, and related method, having a plurality of energy harvesting devices and a plurality of power draining devices communicatively connected to one another via a wireless network, wherein the energy/power harvesting devices are configured to harvest and/or generate electrical energy and further transmit the electrical energy wirelessly to the power draining devices. In some embodiments, one of the energy harvesting devices may wirelessly transmit electrical energy to multiple power draining devices at any given moment. Additionally, or in the alternative, multiple energy harvesting devices may wirelessly transmit electrical energy—either simultaneously or consecutively—to one power draining device. Additionally, or in the alternative, a power draining device requesting power may receive electrical energy from a single energy harvesting device.

The energy harvesting devices and power draining devices constitute nodes in the wireless network, which has a mesh network architecture. Communications traffic (e.g., request for power, power data, message regarding presence in network, etc.) is routed from one node to one or more neighboring nodes, which subsequently routes the traffic to one or more of its neighboring nodes and so on until a final node is reached. In this case, when one of the power draining devices requires electrical energy, it sends a request for power to the nearest neighboring node. If the neighboring node is another power draining device, it passes the power request onward to other neighboring nodes. Once the power request is received by a node that is an energy harvesting device, a processor in the energy harvesting device analyzes the power data of the requesting power draining device to determine how much electrical energy must be transmitted thereto. The processor compares the power data to the amount of electrical energy that the energy harvesting device has harvested or is capable of harvesting and determines if the energy harvesting device can meet the energy needs of the power draining device. If it can, the energy harvesting device sends a confirmation signal to the requesting power draining device (to cease its request) and begins transmitting electrical energy to the power draining device. The energy harvesting device, in some cases, may send the confirmation signal to all nodes in the wireless network to notify that it is able to address the energy needs of the power draining device. On the other hand, if the energy harvesting device determines that it is unable to provide sufficient electrical energy to the requesting power draining device (e.g., to fully charge the power draining device), the energy harvesting device forwards the power request signal to its neighboring nodes.

In other embodiments, the processor of the energy harvesting device that receives a power request compares the power data of the requesting power draining device to the power data of the energy harvesting device to determine if the energy harvesting device can at least meet a portion of the energy needs of the power draining device. With the ability to provide some of the needed electrical energy to the requesting power draining device, the energy harvesting device begins to transmit electrical energy. The energy harvesting device will also send (before, during/simultaneously, or after transmission of electrical energy) a signal to neighboring nodes to determine if a second nearby energy harvesting device is able to supply electrical energy to satisfy the remaining energy needs of the requesting power draining device. The signal from the first energy harvesting device to the second energy harvesting device may comprise the original power data of the requesting power draining device as well as power data of the first energy harvesting device (information on the amount of electrical energy the first energy harvesting is able to provide). The second energy harvesting device will analyze the data and information received and calculate how much electrical energy it must send to meet the remaining energy needs of the requesting power draining device. In some embodiments, the first and second energy harvesting devices transmit electrical energy simultaneously to the power draining device. Alternatively, the first and second energy harvesting devices transmit electrical energy one after the other in a consecutive manner. The first energy harvesting device, for example, may send a signal after completing power transmission which instructs the second energy harvesting device to begin its own power transmission to the power draining device. Any number of energy harvesting devices may transmit electrical energy to a single power draining device, and the present teachings are not limited to the embodiments of one or two energy harvesting devices shown and described.

The power transmitters of the energy harvesting devices are configured to transmit electrical energy using electromagnetic waves (such as radio waves, microwaves, lasers, or a combination thereof), sounds waves, and/or other similar mediums. As will be appreciated by one skilled in the art, the wireless mesh energy network system may incorporate other forms/mediums of transmitting electrical energy and is not limited to the examples described above. In some embodiments, the power transmitter and the communications transceiver are the same component in the energy harvesting device. Alternatively, the power transmitter and the transceiver are two separate components in the energy harvesting device. The power receivers of the power draining devices are configured to receive electrical energy using one or more of radio waves, microwaves, or lasers. The power receivers and the communications transceiver of a given power draining device may form a single component or may be two separate components. It is noted that a power transmitter may function as a power receiver when an energy harvesting device switches to operating as a power draining device. The power receiver of a power draining devices may similarly switch to power transmission functions when the power draining device operates as an energy harvesting device.

In accordance with the present invention, the energy harvesting device harnesses energy from motion or other sources and converts it into electricity. For example, the energy harvesting device may comprise one or more mechanisms for harvesting energy, such as a solar panel or solar cell (converting energy of light into electricity), wind turbine (converting wind power into electricity), wave pump (converting wave power into electricity), hydroelectric turbine (converting flow of water into electricity), thermoelectric elements/generators or Peltier tiles (converting thermal energy into electricity), piezoelectric devices (converting stress or strain into electricity), triboelectric generators (converting frictional forces into electricity) and mechanisms that harvest electrical energy from shocks, vibrations or rotational motion. In some embodiments, the energy harvesting device uses microgenerators or inductive coils to harvest electrical energy or uses other methods known in the art.

The power draining devices are in communication with the energy harvesting devices to provide information such as identity of the device, battery status and/or power data (current, voltage, wattage, volt-amps, volt-amps reactive, battery status, power factor, harmonics, charge rate, discharge rate, etc.). Such information allows for energy harvesting devices to prioritize to which power draining devices to wirelessly send energy.

The power transmitters of the energy harvesting devices may comprise either directional or omnidirectional antennas to wirelessly transmit power to the power draining devices. In some embodiments, the power transmitters are each equipped with both directional and omnidirectional antennas or with one antenna that has the capacity to perform directional and omnidirectional transmission. A directional antenna and directional transmission are useful in transmitting electrical energy to a designated power draining device because power is radiated and received in specific directions, thereby allowing for increased performance and reduced interference from other sources. An omnidirectional antenna and omnidirectional transmission is characterized by electromagnetic wave power radiating uniformly in all directions in one plane, wherein the radiated power decreases with elevation angle above or below the plane. Omnidirectional transmission may be beneficial when the energy harvesting device is concurrently transmitting electrical energy to multiple power draining devices, especially power draining devices positioned in different directions relative to the energy harvesting device.

One or more energy harvesting devices may be used to transmit power to one or more power draining devices. For example, multiple energy harvesting devices may feed electrical energy to one power draining device. In other instances, one energy harvesting device may distribute electrical energy to a plurality of power draining devices simultaneously.

In some embodiments, the energy harvesting device includes a storage unit (e.g., battery, electrochemical cell, accumulator) to store the electrical energy that is harvested or generated and later distribute it to one or more power draining devices upon demand. In some embodiments, the power draining device includes a storage unit (e.g., battery, electrochemical cell, accumulator) to store the electrical energy that it receives from an energy harvesting device(s).

Other features and aspects of the invention will become apparent from the following detailed description, taken in conjunction with the accompanying drawings, which illustrated by way of example the features in accordance with embodiments of the invention. The summary is not intended to limit the scope of the invention, which is defined solely by the claims attached thereto.

DETAILED DESCRIPTION

The present invention is described more fully hereinafter with reference to the accompanying drawings, in which the present embodiments are shown. The following description is presented for illustrative purposes only and the present teachings should not be limited to these embodiments. Any system, method, controller configuration and/or architecture satisfying the requirements described herein may be suitable for implementing the wireless mesh energy network system and method of the present embodiments.

As used herein, the term "energy" means electrical energy and encompasses electrical power, electricity and the like. The terms "energy", "power", "electrical energy", "electrical power" and "electricity" are used interchangeably herein.

The terms "energy harvesting device" and "energy generating device" are used interchangeably herein and refer to a device having a main function of harvesting or generating electrical energy from motion or other sources and further distributing the electrical energy to charge and/or power other devices. The terms "power draining device" and "power drawing device" are used interchangeably herein and refer to a device which is currently using electrical energy (electricity) to perform an operation other than energy generation or energy harvesting.

One benefit of the present invention is the ability to provide dynamic, intelligent allocation and distribution of electrical power between one or more source nodes (e.g., energy harvesting devices, energy generating devices) and one or more destination nodes (e.g. power draining devices, power drawing devices) via a wireless energy network.

Another benefit of the present invention is the ability prioritize allocation and distribution of electrical power from one or more energy harvesting devices to one or more power draining devices via a wireless energy network. The energy harvesting devices may utilize information about the power draining devices to determine a priority with respect to which power draining devices should receive electrical energy. Such information may include, for example, the identity of the power draining device, power data (e.g., current, voltage, wattage, volt-amps, volt-amps reactive, battery status, power factor, harmonics, discharge rate, etc.), and urgency (e.g., low power indicator).

Figure 1:
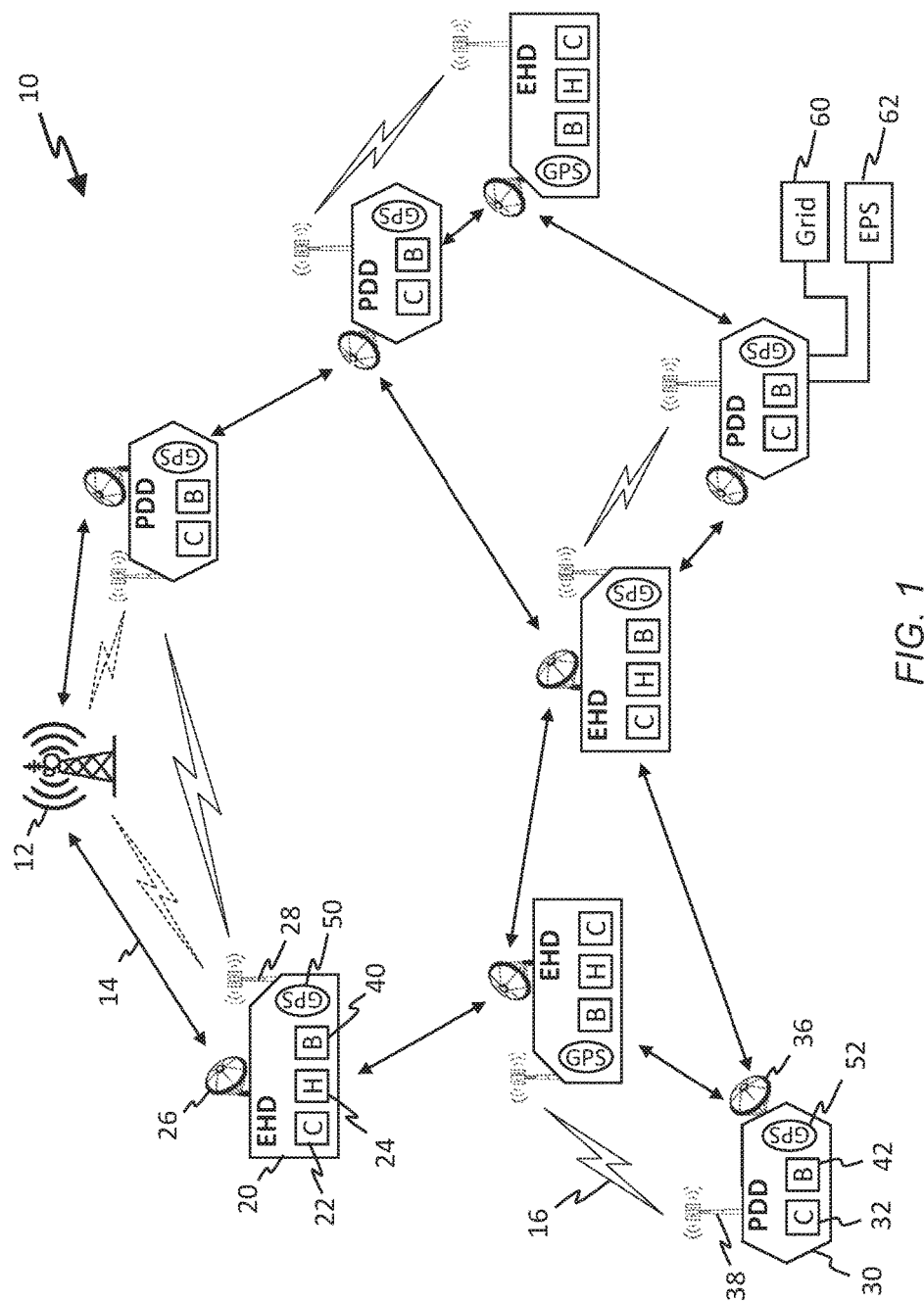
FIG. 1 is a functional diagram showing one embodiment of a wireless mesh energy network with energy harvesting devices and power draining devices in accordance with the present teachings.

Referring to the figures in detail and first to FIG. 1, there is shown an exemplary embodiment of a wireless mesh energy network system, and related method thereof. The wireless mesh energy network system 10 includes at least one energy harvesting device 20 and at least one power draining device 30. FIG. 1, in particular, shows the network system comprising four energy harvesting devices 20 and four power draining devices 30, although not limited to thereto. The network system may include any numbers of energy harvesting devices 20 and any number of power draining devices 30, and the number of energy harvesting devices does not have to match the number of power draining devices. The one or more energy harvesting devices gather/harvest or generate electrical energy and store the electrical energy for transmittal and use in the one or more power draining devices. The energy harvesting devices 20 may include a local battery or storage unit 40 to store the electrical energy upon energy harvest or generation. Similarly, the power draining device 30 may have a battery or storage unit 42 to store the electrically energy it receives from an energy harvesting device.

In some embodiments, an energy harvesting device 20 may operate as a power draining device in certain circumstances. The energy harvesting device 20 may be configured such that if it has a power state below a predetermined operational threshold value (e.g., a value between 40% and 0% charge), then the energy harvesting device adjusts itself to operate as a power draining device and thus seeks electrical energy from another energy harvesting device. This may happen if the energy harvesting device previously transmitted out a substantial amount of electrical power and its power state consequently dropped below the operational threshold value. If, however, the power state of the energy harvesting device is still above the operational threshold value, then the energy harvesting device can continue with harvesting operations and transmitting electrical energy to another power draining device. In addition or alternatively, the power draining device 30 may operate as an energy harvesting device in certain circumstances.

Figure 2:
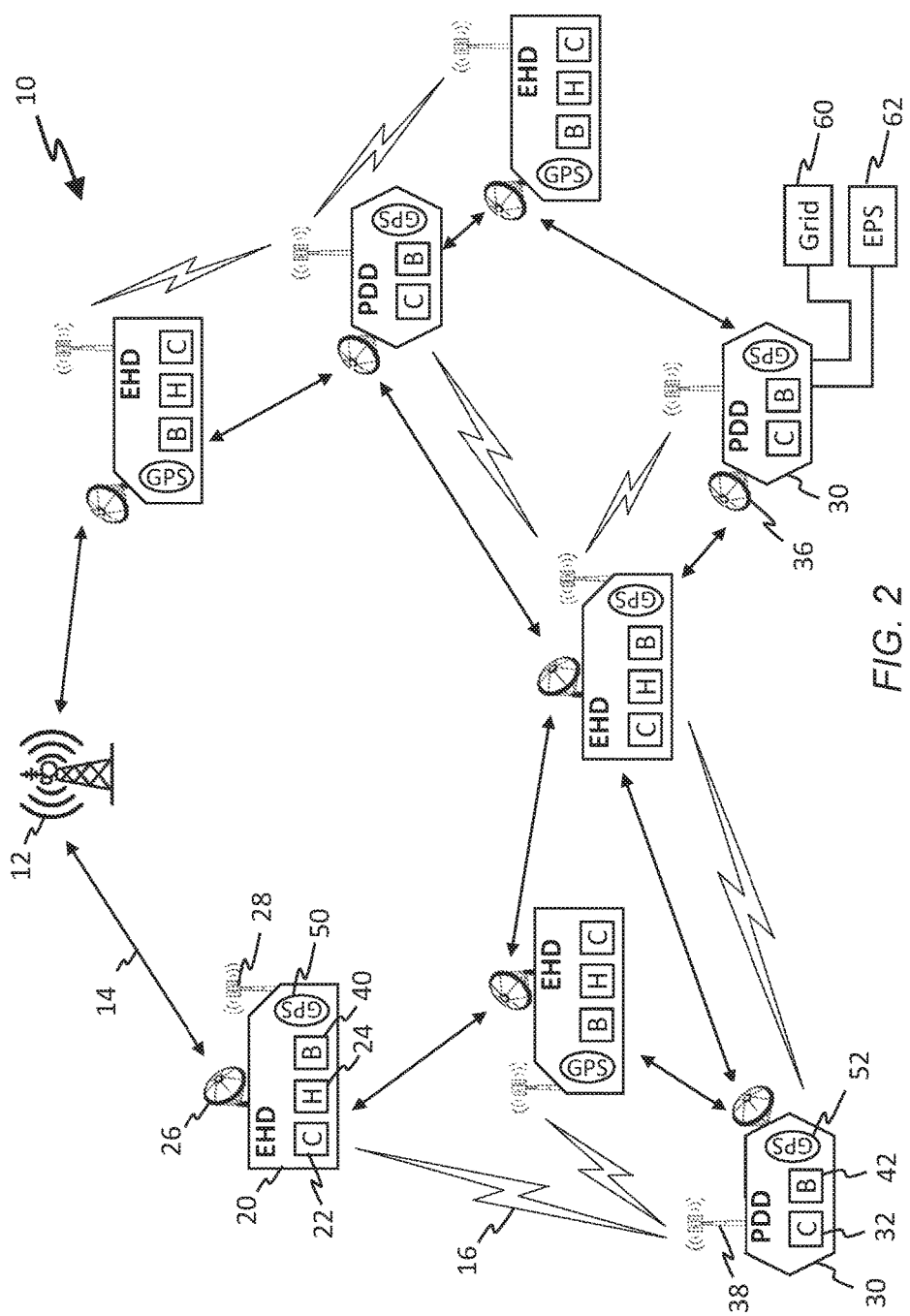
FIG. 2 is a functional diagram of the wireless mesh energy network of FIG. 1 showing a power draining device receiving electrical energy from multiple energy harvesting devices.
Figure 3:
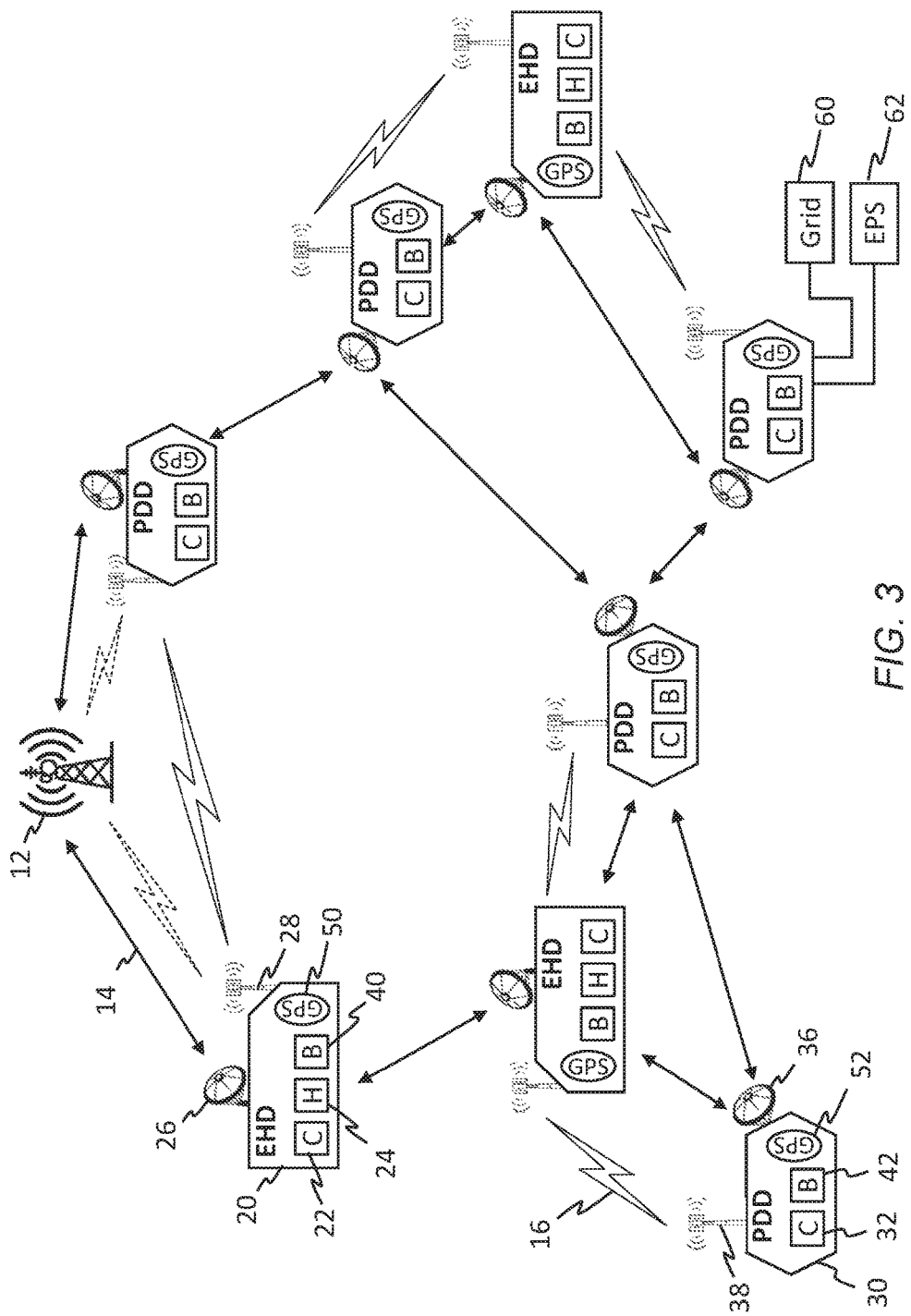
FIG. 3 is a functional diagram of the wireless mesh energy network of FIG. 1 showing an energy harvesting device transmitting electrical energy to multiple power draining devices.

With the above exemplary configuration of the present invention, a mesh of devices is provided such that energy may be distributed out amongst the devices in order provide intended functions. One or more energy harvesting devices 20 may gather and store energy for transmission to and use by one or more power draining devices 30. FIG. 1, for example, shows a one-to-one configuration, where one energy harvesting device 20 wirelessly transmits electrical power to one power draining device 30. FIG. 2 shows some of the power draining devices 30 receiving electrical power from multiple energy harvesting devices 20. FIG. 3 shows some of the energy harvesting devices 20 each transmitting electrical power to multiple power draining devices 30. As will be appreciated by one skilled in the art, the wireless mesh energy network system 10 may incorporate one or more of the architectures of FIGS. 1-3 and is not limited to only one of the described architectures.

Each energy harvesting device 20 includes a control unit or controller 22 that manages the harvesting/generating of electrical energy, monitors its power parameters (current, voltage, wattage, volt-amps, volt-amps reactive, battery status, power factor, harmonics, charging rate, etc.) and further the transmission of the electrical energy to one or more power draining devices 30. Each power draining device 30 also includes a control unit or controller 32 to monitor its power parameters (e.g., current, voltage, wattage, volt-amps, volt-amps reactive, battery status, power factor, harmonics, discharging rate, etc.). If the power draining device 30 requires electrical energy, for example, when it has a power state below a predetermined threshold (e.g., battery is less than a value between 40% and 0% charge), the controller 32 transmits a power request signal and power data to neighboring nodes in attempt to receive electrical power wirelessly. The controllers 22, 32 may comprise a processor, microprocessor, embedded programmable chip, electronic control unit or other processing unit. The controllers 22, 32 may also control whether a device switches operation (from energy harvesting to power draining, or from power draining to energy harvesting) as previously discussed.

The energy harvesting devices 20 and the power generating devices 30 may also have a GPS module or chip 50, 52 for identifying the location of the respective devices. The GPS module or chip may utilize standard GPS technology, assisted GPS technology and/or synthetic GPS technology. In addition to the GPS module or alternatively, the energy harvesting devices 20 and the power generating devices 30 may have a wifi-based, radio-based and/or cellular-based geolocation module or chip for determining the location of the respective devices. Still further in addition to or alternatively, the devices 20 and 30 may include inertial sensors, a barometer, ultrasonics, Bluetooth beacons, and/or terrestrial transmitters to assist in location awareness. As will be appreciated by one skilled in the art, the energy harvesting devices 20 and the power generating devices 30 may include other geolocation modules or chips and are not limited to the examples described above. The location data of each device may be shared with all other devices in order to compile a list of devices that are present in the wireless mesh network and determine the relative positions of the devices to one another.

Figure 4:
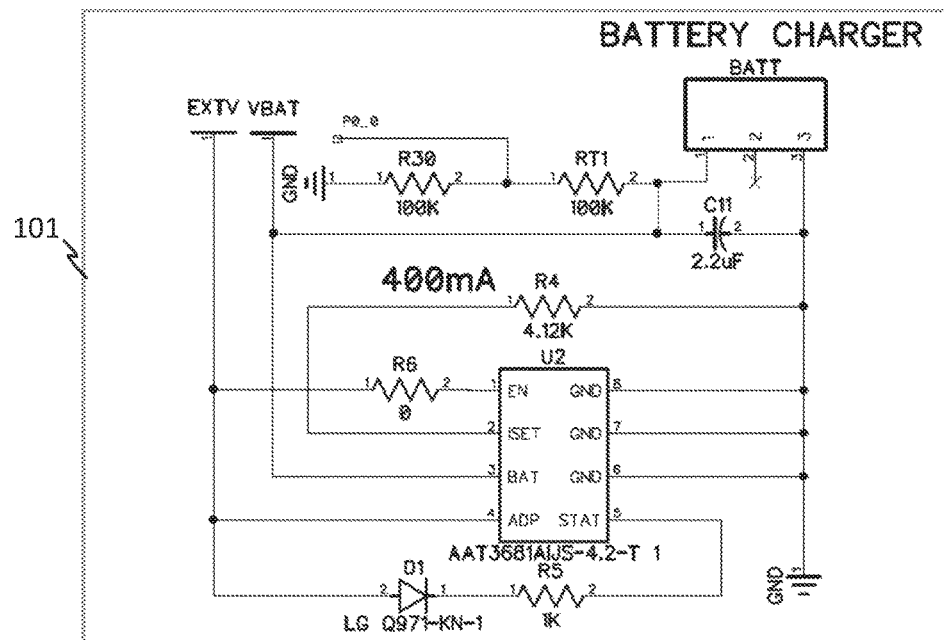
FIG. 4 is a circuit diagram showing one embodiment of a battery charging circuitry of the energy harvesting device of the wireless mesh energy network of FIG. 1.
Figure 5:
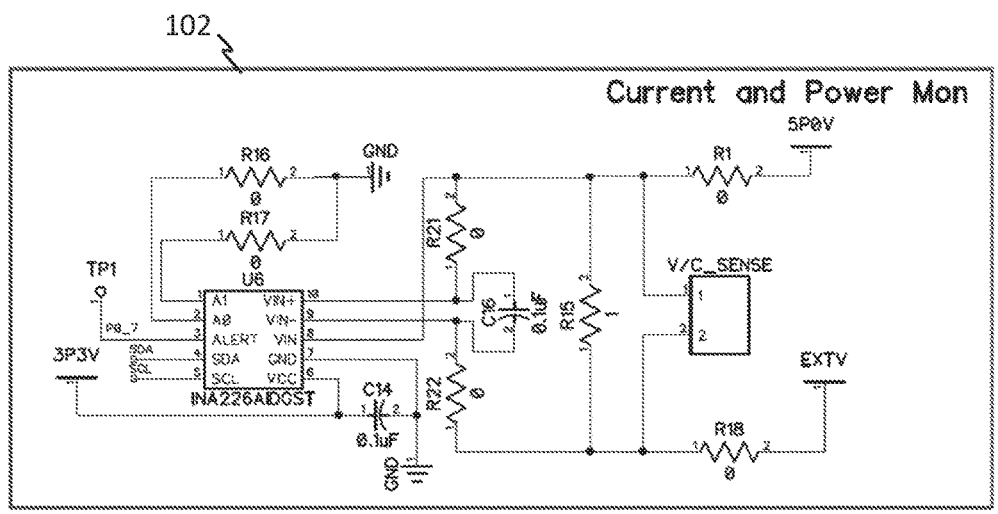
FIG. 5 is a circuit diagram showing one embodiment of a current regulating circuitry of the energy harvesting device of the wireless mesh energy network of FIG. 1.
Figure 6:
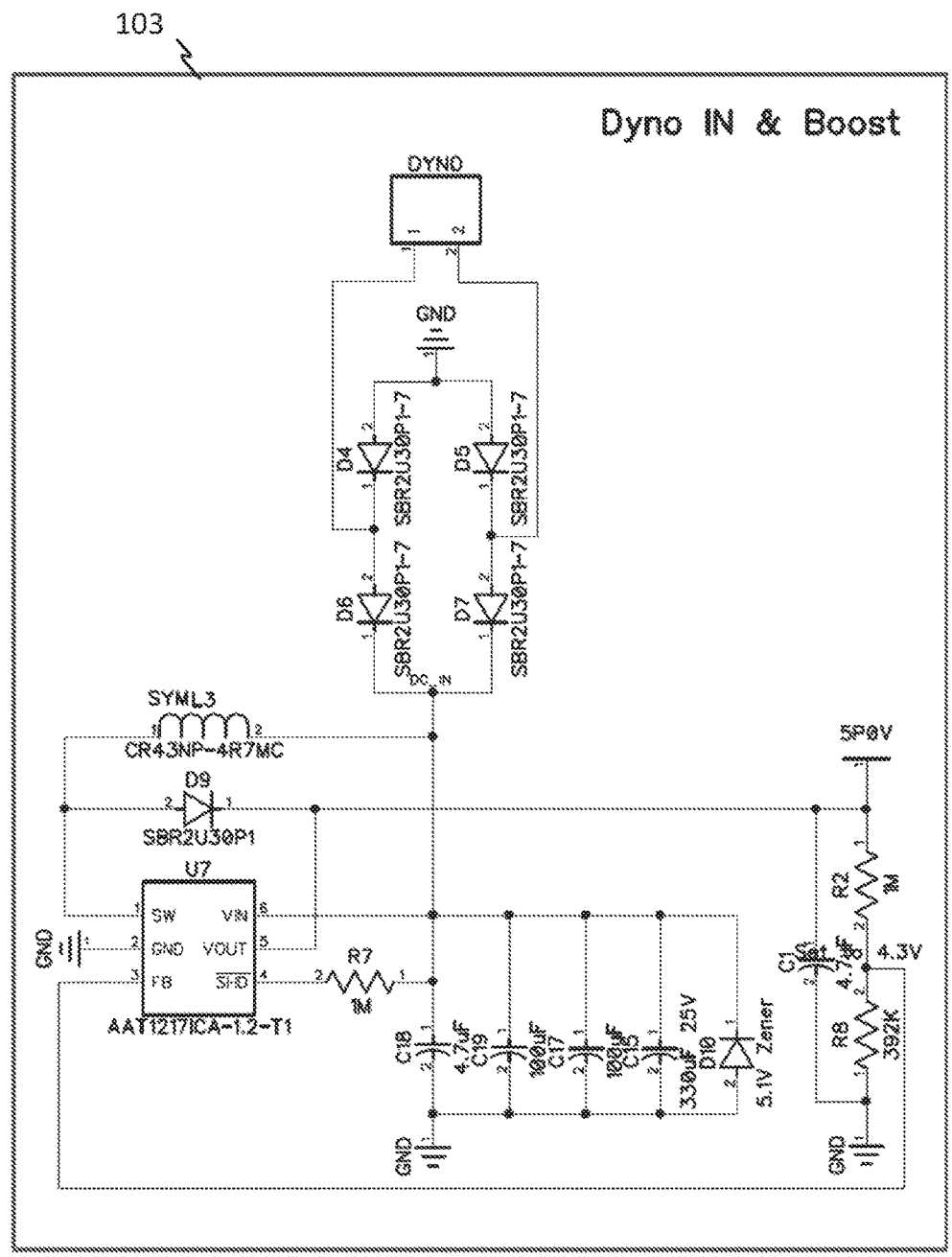
FIG. 6 is a circuit diagram showing one embodiment of a voltage boosting circuitry of the energy harvesting device of the wireless mesh energy network of FIG. 1.

As shown in FIG. 1, the energy harvesting device 20 has a harvesting mechanism 24 configured to harness or collect energy from motion or other sources (e.g., kinetic energy, mechanical energy, etc.) and convert it into electrical energy. The controller 22 is configured to control the operation of the harvesting mechanism 24 and how generated electrical energy is stored in the battery 40. In some embodiments, the harvesting mechanism 24 may obtain electrical energy from rotational motion. The harvesting mechanism may comprise a generator which generates electrical power due to the rotational motion and subsequently stores the electrical power in the battery 40, using variants of the circuits shown in FIGS. 4-6. FIG. 4 shows an exemplary circuit 101 for charging the battery 40 in the energy harvesting device 20. FIG. 5 shows an exemplary circuit 102 for regulating current flow in the energy harvesting device 20. FIG. 6 is an exemplary circuit 103 in the energy harvesting device 20 for boosting the voltage of the harvested/generated electrical power. With this configuration of the harvesting mechanism 24, the energy harvesting device may be a ball, such as a soccer ball, football, basketball, baseball, etc. As other examples, the energy harvesting device may be a skateboard, jump rope, or other athletic equipment which moves when played with. The harvesting mechanism 24 can harness the rotational motion of the wheels on a skateboard and convert it into electrical power. The spin of a baseball or football may be harnessed by the harvesting mechanism 24 (which may be disposed inside the baseball or football) and converted into electrical power.

In other embodiments, the harvesting mechanism 24 may comprise a piezoelectric generator, transducer, or material which creates a voltage differential (e.g., alternating voltage differential or direct voltage differential) when deformed by motion. The piezoelectric element is configured to transform mechanical energy into electrical energy. With this configuration of the harvesting mechanism 24, the energy harvesting device for example may be a shoe with a piezoelectric element embedded in the sole, wherein the piezoelectric element obtains electrical energy from the stress/strain/deformation in the sole caused by walking or running. The energy harvested by the piezoelectric element is stored in the battery 40 using variants of the circuits shown in FIGS. 4-6.

The harvesting mechanism 24 in other embodiments may comprise a thermoelectric generator or Peltier element (e.g., Peltier tile), which can charge the battery 40 via thermal energy. The thermoelectric generator or Peltier element generates electrical power from a temperature difference and stores this power in the battery 40 using variants of the circuits shown in FIGS. 4-6.

The harvesting mechanism 24 in other embodiments may comprise a vibration-powered generator or similarly a piezoelectric element (e.g., piezo ceramics) configured to convert the kinetic energy from mechanical shocks or vibration into electrical energy. The shocks and vibrations may for example be from dribbling a basketball or the impact a baseball experiences when it is hit by a bat and caught in a glove. The vibrations alternatively are from sound pressure waves or other ambient sources. The vibration-powered generator has a resonator for amplifying the vibration source and a transducer which converts the energy from shocks and/or vibrations into electrical energy, which is then stored in the battery 40 using variants of the circuits shown in FIGS. 4-6.

The harvesting mechanism 24 in other embodiments may be a triboelectric generator or device utilizing triboelectric effect to create electrical power by rubbing or touching two dissimilar materials together—one an electron donor, the other an electron acceptor. That is, the triboelectric generator produces electricity by harnessing frictional forces. With this configuration of the harvesting mechanism 24, the energy harvesting device for example may be in the form of a shoe insert which harvests human walking energy. The harvesting mechanism 24 then stores the generated electrical energy into the battery 40 using variants of the circuits shown in FIGS. 4-6.

In some embodiments, the harvesting mechanism 24 may comprise inductive coils and generate electrical energy by moving a magnet through coils of copper wire, which induces a current which is captured and stored in the battery 40 using variants of circuits shown in FIGS. 4-6.

In still other embodiments, the harvesting mechanism may comprise solar panels or thin-film solar cells which harnesses the sun's rays to generate electricity. The harvesting mechanism may comprise a wind turbine for converting wind power into electricity. A wave pump or a hydroelectric turbine may be the harvesting mechanism, wherein wave power or the flow of a liquid is converted into electricity.

The harvesting mechanism 24 of the energy harvesting device 20 may comprise any one of the above described forms or any combination of the above described forms. For example, the harvesting mechanism may utilize both a triboelectric generators and a piezoelectric generator in the context of a shoe to generate and store electricity. The energy harvesting device 20 may further have smart features to be powered by the energy harvesting features, or through power sharing features. As will be appreciated by one skilled in the art, the energy harvesting devices 20 and associated harvesting mechanisms 24 may utilize other known methods of harvesting energy and are not limited to the examples described above.

The power draining devices 30 are completely separate from the energy harvesting devices 20. The power draining devices are disposed in different locations relative to the energy harvesting devices. In some embodiments, the power training devices comprise lights, scoreboards, mobile devices (e.g., laptop, mobile phone, tablet, PDA, watches, etc.) or other devices requiring electrical power. In some embodiments, the power draining devices 30 are related to the use of the energy harvesting devices 20. As one example, scoreboards are power draining devices while sports equipment are the energy harvesting devices, or the lights within a stadium are the power draining devices while spectator's shoes are the energy harvesting devices. In another example, a person's shoes are energy harvesting devices which transmit power to the person's cellphone while the person is walking. The power draining devices may have backup energy sources, such as a power outlet connected to a power grid 60 or an external power supply 62 (e.g., uninterrupted power supply).

Wireless communications or communication paths 14 between the energy harvesting devices 20 and the power draining devices 30 are established via communication transceivers 26, 36. More specifically, the transceiver 36 of the power draining device 30 is configured to transmit a "request for power" signal from the controller 32 to neighboring nodes (i.e., neighboring energy harvesting devices and/or power draining devices) when the power draining device requires power. In addition, the transceiver 36 is configured to transmit power data of the power draining device, which is collected by the controller 32 using various sensors (e.g., current sensor, voltage sensor, etc.). When an energy harvesting device 20 receives the "request for power" signal via the transceiver 26, the controller 22 of the energy harvesting device evaluates whether it is capable of providing sufficient electrical energy to the requesting power draining device and to meeting the power needs of the requesting power draining device. The controller 22 makes this determination by analyzing the power data of the requesting power draining device and comparing it to power data of the energy harvesting device, i.e., charge status of the battery 40. For example, if the charge status of the battery 40 is high enough to fully charge the requesting power draining device, then the controller 22 will initiate wireless transmission of electrical energy. In some embodiments, the controller 22 also utilizes location data from the GPS module 52 of the requesting power draining device and compares it to its own location (GPS data from GPS module 50) to determine their proximity and direction to one another. The identity of the requesting power draining device can play a factor in determining whether the energy harvesting device is capable and further should provide electrical power to the requesting power draining device. Other factors that the controller 22 may take into account when determining whether to transmit electrical power to the requesting power draining device is if there is another power draining device(s) that is presently requesting power, if that other power draining device(s) is closer to the energy harvesting device, and/or if that other power draining device(s) has priority (depending on its identity, whether its function is critical, etc.). In some embodiments, the controller 22 may send a confirmation signal back to the transceiver 36 of the requesting power draining device to indicate that it will receive electrical energy. The controller 32 of the requesting power draining device, in turn, may cease to transmit a "request for power" signal.

In some embodiments, the transceivers of all nodes in the wireless mesh energy network use the communication paths 14 to periodically send messages to one another to indicate their presence in the network. This can be important as the energy harvesting devices and/or power draining devices may be mobile and either enter or leave the network.

The transceivers 26, 36 may be designed to utilize broadcasting techniques, point-to-point communication, multicasting techniques, or a combination thereof to create the communication paths 14. With broadcasting, a signal is transmitted without singling out any particular target node among a potential audience of one or more recipient nodes. Point-to-point communication establishes a direct connection between two nodes, such that a signal is sent only to the targeted node among an audience of one or more recipient nodes. With multicasting, a signal is transmitted by singling out a group of targeted nodes among a potential audience of recipient nodes.

The transceivers 26, 36 may comprise one or more wireless communication technologies. For example, the transceivers of both devices may utilize Bluetooth technology to exchange data from fixed and mobile devices. The transceivers may utilize ANT technology, which defines a wireless communications protocol that enables hardware operating in, for example the 2.4. GHz band, to communicate under standard rules for coexistence, data representation, signaling, authentication and/or error detection. With ANT-based transceivers, the energy harvesting devices and the power draining devices are capable of determining when to transmit based on the activity of its neighbors. In another example, the transceivers may utilize ZigBee technology such that network communication is established with radios using radio waves. Other wireless communication technologies may be implemented in the wireless mesh energy network system and the present teachings are not limited to the specific technologies shown and described.

As shown in FIG. 1, communications 14 between an energy harvesting device 20 and a power draining device 30 may require a hopping point, relay device, or intermediate node 12 if there is poor line of sight or long distances between the two devices. In some embodiments, the intermediate node 12 may comprise a bridge, router, or gateway. In other embodiments, the intermediate node 12 may be a communications tower. In other embodiments, the intermediate node 12 may be a satellite. In still other embodiments, the intermediate node 12 may be an energy harvesting device or a power draining device. A detailed description of the intermediate node is provided further below with respect to FIG. 10.

The energy harvesting devices 20 each have a power transmitter 28 for wirelessly transmitting electrical energy using electromagnetic waves 16, such as radio waves, microwaves, lasers, or a combination thereof. As shown in FIG. 1, the power transmitter 28 and the communications transceiver 26 are two separate components of the energy harvesting device. However, in some embodiments, the power transmitter 28 and the communications transceiver form a single component or element in the energy harvesting device. In order to receive the electrical energy, the power draining devices 30 have power receivers 38, which are configured to intercept the path of electromagnetic waves 16 and convert them into current (e.g., alternating current) and thus usable electrical energy. The power receiver 38 and the communications transceiver 36 of a power draining device 30 may be two separate components, as shown in FIG. 1, or may form one single component. Once the power receiver 38 coverts the electromagnetic waves 16 into electrical energy, the electrical energy may be stored in the battery 42. In addition or alternatively, the electrical energy may be used immediately by the power draining device in order to perform its intended operations/functions (e.g., scoreboard showing real-time scores for a sports event).

The power transmitters 28 and the power receivers 38 are configured to switch modes and function as receivers and transmitters, respectively. This switch in mode may occur, for example, when the energy harvesting device 20 becomes a power draining device due to having a power state that is less than a predetermined operational threshold value.

In some embodiments, the power transmitters 28 and power receivers 38 comprise directional antennas. In other embodiments, the transmitters 28 and receivers 38 comprise omnidirectional antennas. In still other embodiments, the transmitters 28 and receivers 38 each may comprise both types of antennas or alternatively one antenna that is adapted to perform directional and omnidirectional transmission.

Referring to FIG. 1, an energy harvesting device 20 may utilize location data provided by the GPS module 52 of a requesting power draining device 30, as well as its own location provided by the GPS module 50, to configure the power transmitter 28 for directional transmission. For example, the controller 22 of the energy harvesting device 20 can calculate the distance and direction to the requesting power draining device 30 from the GPS data, and control the power transmitter 28 to accurately direct electrical energy towards the receiver 38 of the requesting power draining device.

FIG. 2 shows, for example, a power draining device 30 receiving electrical power from multiple energy harvesting devices 20, either simultaneously or consecutively. In this case, a first energy harvesting device 20 nearest to the requesting power draining device 30 may not have sufficient electrical power (i.e., not enough charge in its battery 40) to fully charge the power draining device. As a result, the first energy harvesting device sends a signal to neighboring energy harvesting devices to inform them that it is unable to completely satisfy the energy needs of the requesting power draining device and ask if they can supplement electrical energy. A second (next nearest) energy harvesting device which can provide the supplemental electrical energy can send a signal answering the first energy harvesting device and informing the requesting power draining device of its intent to supplement electrical energy. Additional energy harvesting devices may also provide supplemental energy to the requesting power draining device. In similar respect to FIG. 1, the energy harvesting devices may utilize GPS data to configure their respective power transmitters 28 for either directional or omnidirectional transmission. In some cases, one or more of the energy harvesting devices may configure the power transmitters for omnidirectional transmission, depending on their distance from the requesting power draining device. It is known that omnidirectional can deliver over longer distances than directional. Accordingly, for example, the first (nearest) energy harvesting device may use directional transmission while the second (further) energy harvesting device may use omnidirectional transmission. In FIG. 2, one energy harvesting device 20 is shown using omnidirectional transmission to distribute electrical energy to all of the power draining devices 30.

FIG. 3 shows, for example, an energy harvesting device 20 transmitting electrical energy to multiple power draining devices 30 simultaneously. The power transmitter 28 of the energy harvesting device may be configured for omnidirectional transmission in order to provide electrical energy to two (or more) power draining devices 30 that are positioned in different locations and/or directions relative to the energy harvesting device. In some embodiments, if the requesting power draining devices are located close to one another in the same general direction, the power transmitter 28 may be configured for directional transmission to provide electrical energy to both power draining devices concurrently. In other embodiments, even if the requesting power draining devices are located away from each other and/or in substantially different directions, the power transmitter 28 may still be configured for directional transmission. In this case, the power transmitter 28 will constantly switch back and forth between directing power towards the first power draining device and the second power draining device, wherein transmission to each power draining device before a switch lasts for a given period of time (e.g., seconds).

Figure 7:
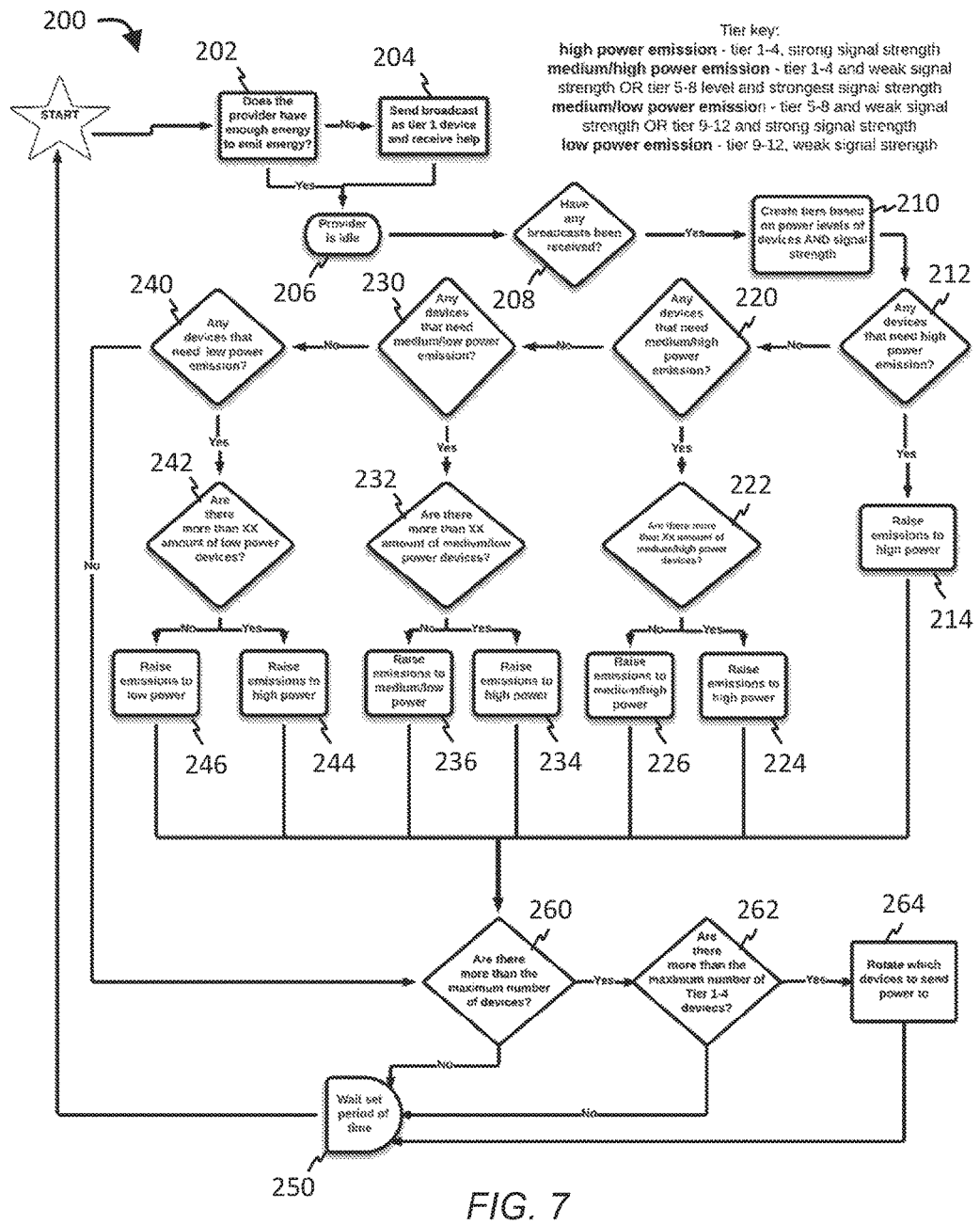
FIG. 7 is a flowchart diagram showing a process of transmitting power from an omnidirectional antenna of the energy harvesting device in the wireless mesh energy network of FIG. 1 according to the present teachings.

In the embodiments where the energy harvesting device 20 has an omnidirectional antenna or uses omnidirectional transmission, the algorithm 200 of FIG. 7 is used to provide power to power draining devices 30. In a first step 202, the energy harvesting device 20 (via its controller 22) determines if it has enough power, for example in its battery 40, to distribute to one or more power draining devices. Should the energy harvesting device not have enough power (e.g., its power state is below a predetermined threshold value), it can broadcast its power data (e.g. battery status, current, voltage, wattage, volt-amps, volt-amps reactive, power factor, harmonics, etc.) and receive electrical energy from nearby energy harvesting devices (step 204). Should it have enough energy to power other devices, it will idle until a similar broadcast has been received from other power draining devices (step 206).

In step 208, the controller 22 monitors whether the communications transceiver 26 has received any broadcast signals from nodes (power draining devices or other energy harvesting devices). If no broadcasts have been received, the energy harvesting device continues to harvest energy via the harvesting mechanism 24. If broadcasts (e.g., "request for power" signals) from one or more power draining devices are received, the controller 22 organizes them into groups based on the energy needs of the power draining devices (a requested "tier") and the signal strength of their broadcasts (step 210). In some embodiments, the tiers represent priority or urgency in which a power draining device is to receive electrical energy (i.e., low number means higher priority, high number means lower priority). Power draining devices in tiers 1-4 and having strong signal strength are said to require "high power emission." Devices broadcasting in tiers 1-4 and having weak signal strength, or broadcasting in tiers 5-8 with high signal strength require "medium/high power emission." Devices broadcasting in tiers 5-8 and having weak signal strength, or broadcasting in tiers 9-12 with high signal strength require "medium/low power emission." Devices broadcasting in tiers 9-12 and having weak signal strength require "low power emission."

If there are devices that require high power emission (step 212), the energy harvesting device will emit at high power (step 214). Power levels are then checked in descending order. If there are devices that require power at the other three power levels (steps 220, 230, 240), there is first a check to see if the number of devices requiring power at that level is above a certain threshold (steps 222, 232, 242). If the threshold is met, the energy harvesting device raises and transmits at high power emission (steps 224, 234, 244). If there are not, the energy harvesting device transmits at the power level assigned to the power draining device (steps 226, 236, 246).

The energy harvesting device then continues to emit power until a set period of time has passed (step 250), and restarts the algorithm process. In an embodiment of the invention, if there are more than the maximum number of devices (step 260), and more than the maximum number of tier 1-4 devices (step 262), the energy harvesting device will rotate to which it sends power before waiting a set period of time (step 264).

Figure 8:
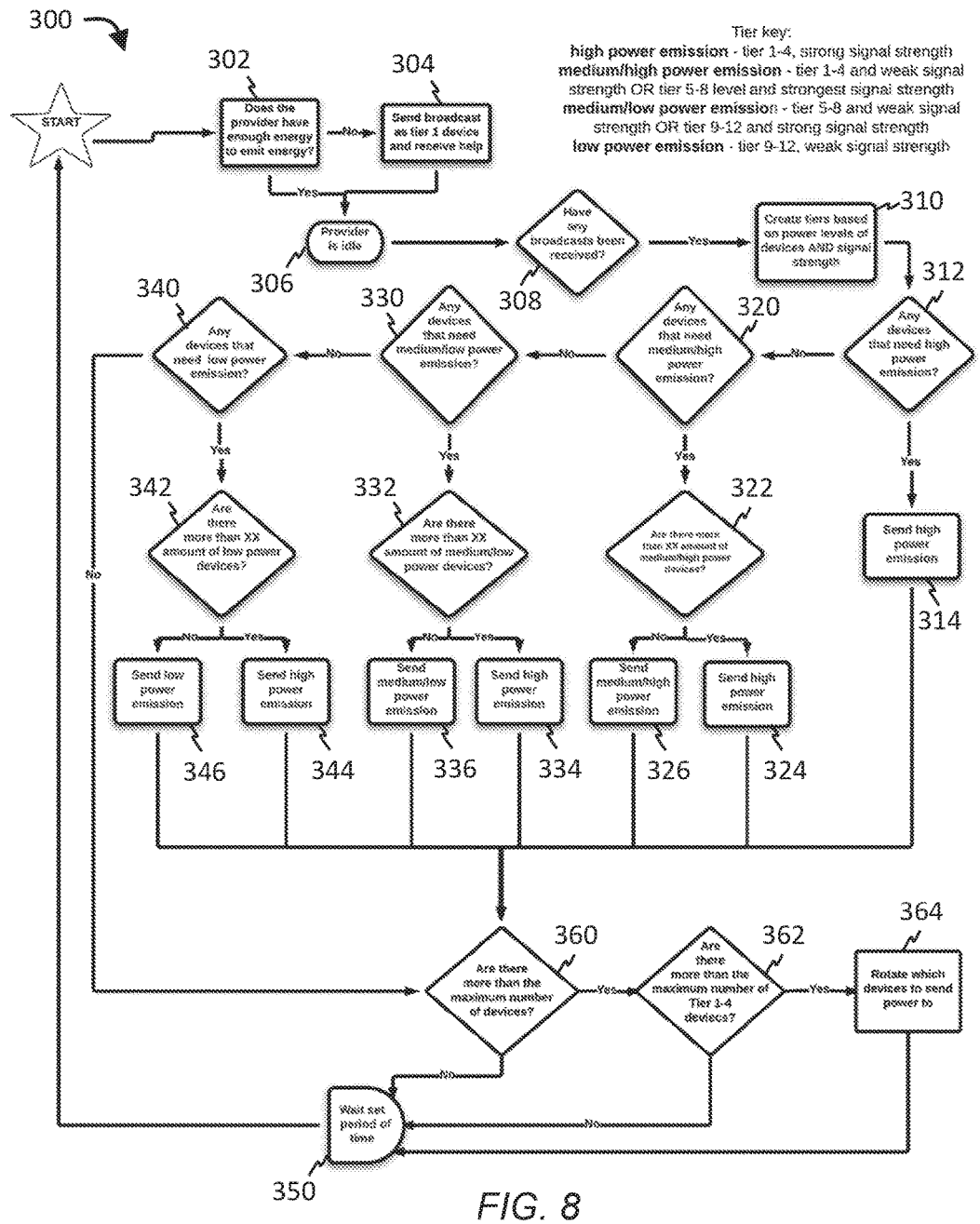
FIG. 8 is a flowchart diagram showing a process of transmitting power from a directional antenna of the energy harvesting device in the wireless mesh energy network of FIG. 1 according to the present teachings.

The algorithm 300 is generally the same for a directional antenna, as shown in FIG. 8. Steps 302-314 and 350 match steps 202-214 and 250 in FIG. 7, respectively. If there are devices that require power at the other three power levels (steps 320, 330, 340), there is first a check to see if the number of devices requiring power at that level is above a certain threshold (steps 322, 332, 342). If the threshold is met, the energy harvesting device transmits at high power emission (steps 324, 334, 344). If there are not, the energy harvesting device transmits at the power level assigned to the power draining device (steps 326, 336, 346). In an embodiment, at the end of the process, if there are more than the maximum number of devices (360) and more than the maximum number of high power emission devices (362), the directional antenna will rotate the devices to which power is sent to, in order to evenly distribute power (step 364).

In some embodiments of the present invention, power draining devices 30 may broadcast their need of power using the tier system that factors in their power level, importance, power usage, and signal strength. For example, power drawing devices may communicate their battery status to energy harvesting devices. Such communication may occur over wireless sensor network technology. Such wireless sensor network technology may include Bluetooth, ANT, ZigBee, or other protocols known in the art.

Figure 11:
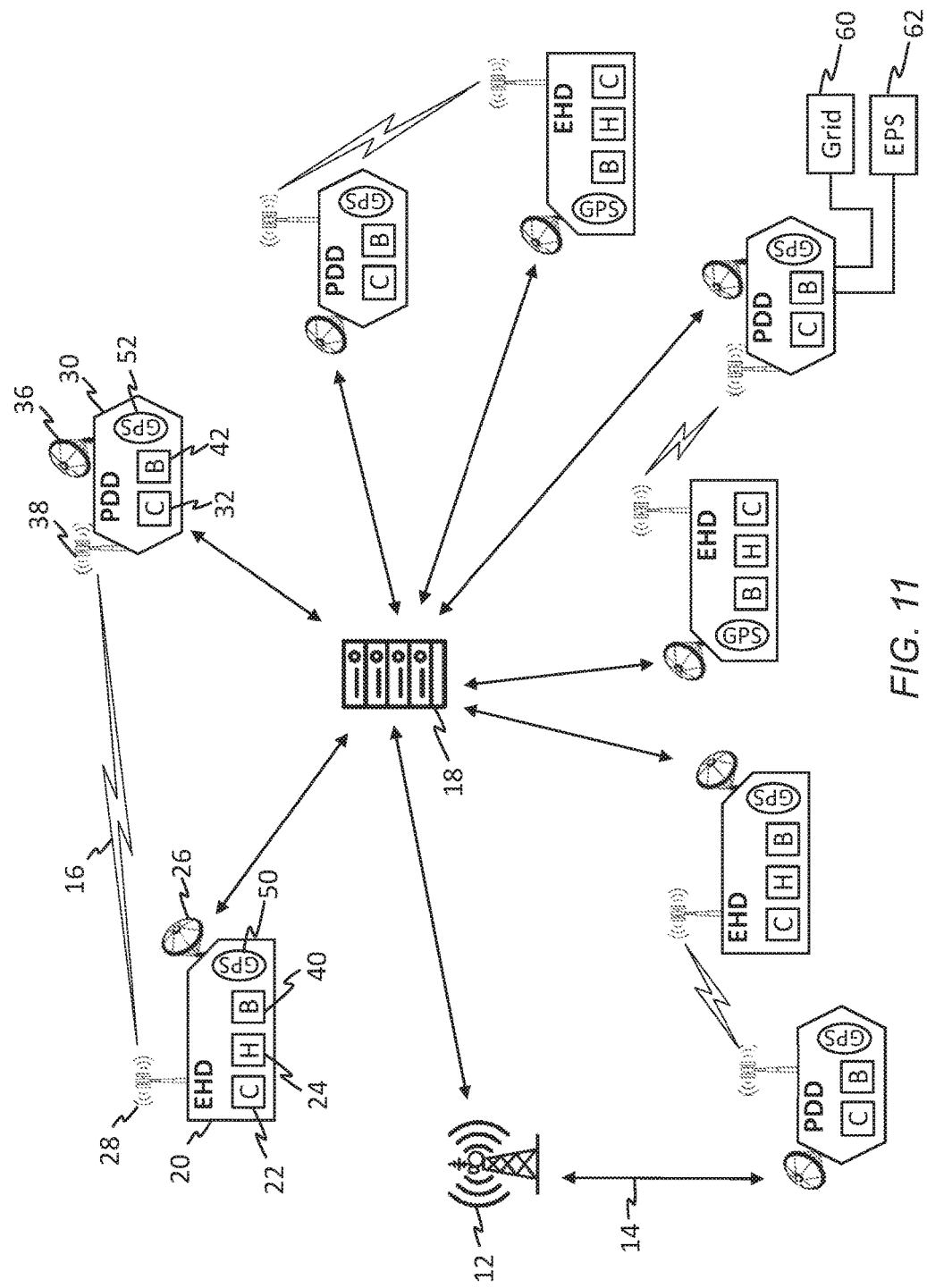
FIG. 11 is a functional diagram of the wireless mesh energy network of FIG. 1 with a central server.

In other embodiments of the invention, there may be a central server 18, as shown in FIG. 11, through which requests for power from power draining devices 30 are processed and communicated to the energy harvesting devices 20. In other embodiments, the central server 18 may also command the energy harvesting devices on how to distribute their power.

Figure 9:
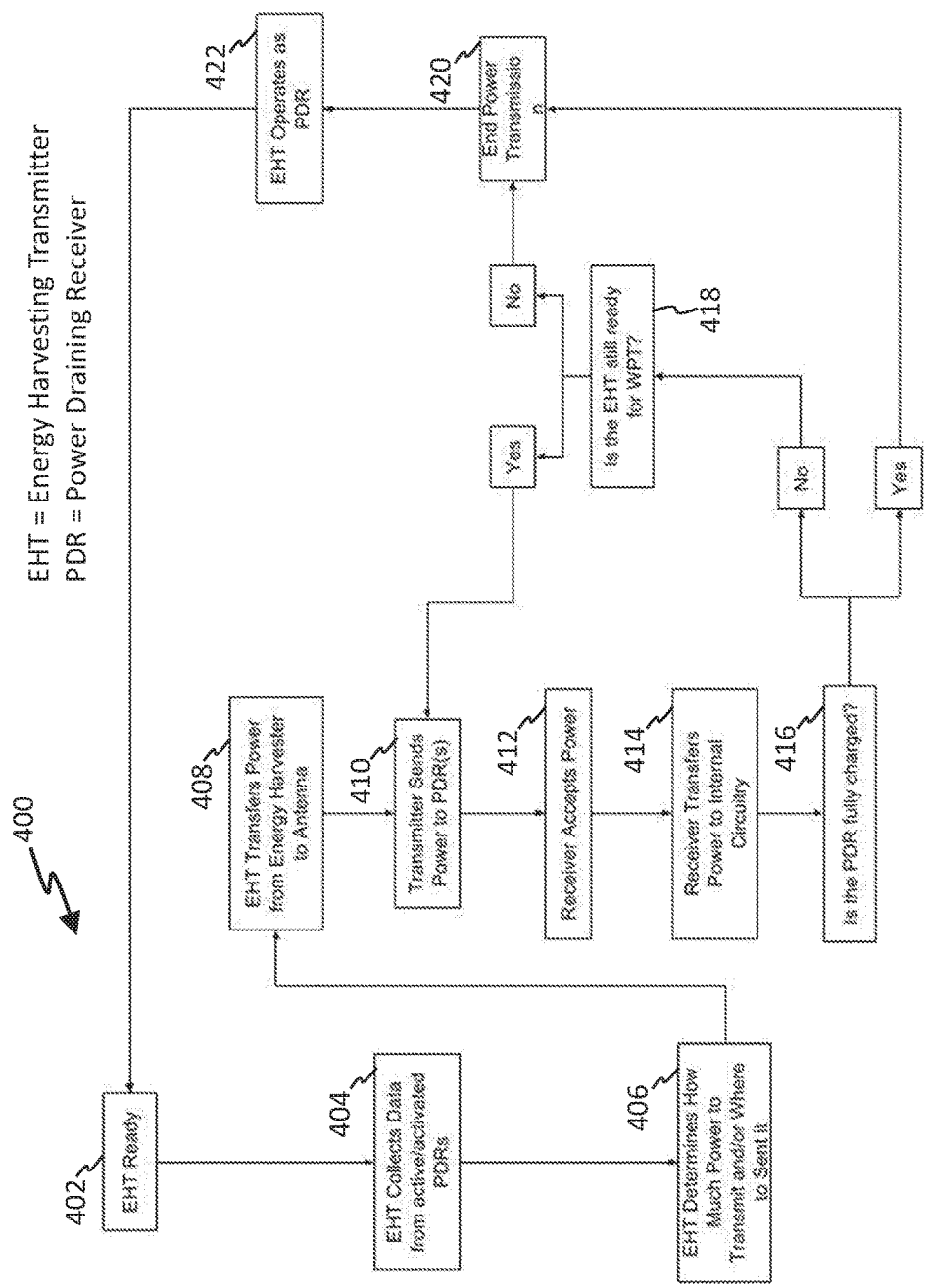
FIG. 9 is a flowchart diagram showing intelligent transmission of power in the wireless mesh energy network of FIG. 1 according to the present teachings.

FIG. 9 shows a process flow for intelligent transmission of electrical energy in the wireless mesh energy network of FIGS. 1-3 and 11. In step 402, for a given an energy harvesting device 20, the controller 22 determines whether the energy harvesting device has ample power stored in its battery 50 and is ready to transmit electrical power to other devices. In step 404, the energy harvesting device receives and collects power data from active/activated power draining devices 30. The energy harvesting device uses the power data of the power draining devices, as well as its own power data, to determine how much power to transmit and where—i.e., which one or more power draining devices—to send the power (step 406). In step 410, the controller 22 transfers power harnessed/generated by the harvesting mechanism 24 to the power transmitter 28, and further performs any processing of the power in preparation for transmission to the power draining device(s).

The energy harvesting device transmits power to the power draining device(s) in step 410. Subsequently, the power draining device(s) intercepts and receives the power from the energy harvesting device (step 412). In step 414, the controller 32 of the power draining device transfers the received power from the power receiver 38 to internal circuitry for purposes of processing and/or regulating the power for usage. In some embodiments, the power can be immediately used by the power draining device. In other embodiments, the power is stored into the battery 42, and the controller 32 monitors whether the power draining device is fully charged (step 416). If not fully charged, it is determined by the power draining device and/or the energy harvesting device whether the energy harvesting device is still ready for wireless power transmission (step 418). Some factors that may be involved in making this determination include the battery level of the energy harvesting device and whether the energy harvesting device must provide electrical energy to another higher-priority power draining device. If the energy harvesting device can still provide power to the initial power draining device, steps 410-416 are repeated. In contrast, if the energy harvesting device is no longer ready for wireless power transmission (e.g., the amount of power the energy harvesting device has is below a threshold value), then power transmission is terminated (step 420). Referring back to step 416, if it is determined that the power draining device is fully charged, then power transmission is terminated (step 420). Thereafter, in step 422, the energy harvesting device may operate as a power draining device in order to receive power from other energy harvesting devices.

Figure 10:
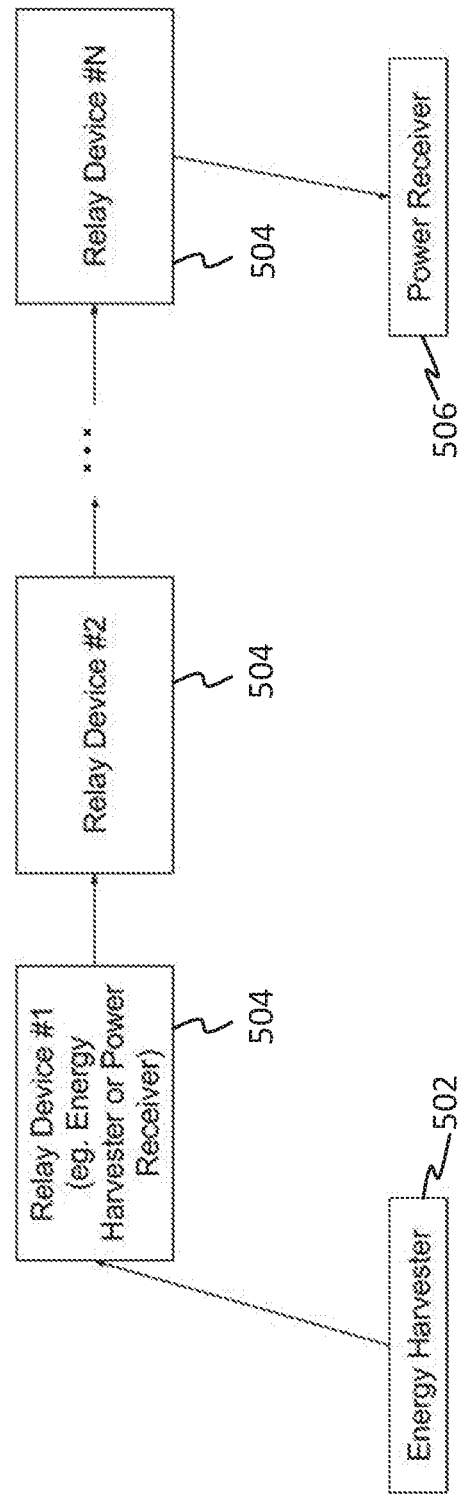
FIG. 10 is a signal relay diagram showing short hops and intermediate nodes used for data and power transmission in the wireless mesh energy network of FIG. 1 according to the present teachings.

FIG. 10 is a signal relay diagram illustrating short hops and intermediate nodes used for data transmission and/or power transmission. Hopping and use of intermediate nodes can be useful for transmitting data and/or power in situations where there is poor line-of-sight or long distances between the energy harvesting device and the power draining device. As shown in FIG. 1, the intermediate node 12 is used as a hop for the communications path 14 between an energy harvesting device and a power draining device. The intermediate node 12 may also be used to serve as a hopping point for the electromagnetic waves 16 (in dashed form) in transmitting the electrical energy from the power transmitter 28 of the energy harvesting device to the power receiver 38 of the power draining device. The use of intermediate nodes can help improve connectivity amongst the devices. It is also known that transmission over multiple "short" links might require less transmitting power than over "long" links. Moreover, they enable higher data rates resulting in higher throughput and more efficient use of wireless medium. As shown in FIG. 10, an exemplary signal relay 500 includes an energy harvesting device 502 transmitting data and/or power through at least one intermediate node or relay device 504 to a power receiver 506. Similarly, data may be transmitted through the relay device 504 from the power receiver 506 before reaching the energy harvesting device 502.

While the invention has been specifically described in connection with certain specific embodiments thereof, it is to be understood that this is by way of illustration and not of limitation, and that various changes and modifications in form and details may be made thereto, and the scope of the appended claims should be construed as broadly as the prior art will permit.

The description of the invention is merely exemplary in nature, and, thus, variations that do not depart from the gist of the invention are intended to be within the scope of the invention. Such variations are not to be regarded as a departure from the spirit and scope of the invention.

What is claimed is:

1. A wireless energy network system comprising:
    at least one energy harvesting device configured to harvest electrical energy from at least one external source, the at least one energy harvesting device having a first transceiver for communication and a power transmitter configured to wirelessly transmit said electrical energy;
    at least one power draining device having a second transceiver which is communicatively connected to the first transceiver of the at least one energy harvesting device via a wireless mesh network, the at least one power draining device having a power receiver configured to wirelessly receive said electrical energy;
    the at least one power draining device generating a request signal which indicates that the power draining device requires power to maintain functional operation, the request signal being communicated from the power draining device over the wireless mesh network and received by the at least one energy harvesting device;
    wherein, upon receiving the request signal, the at least one energy harvesting device dynamically allocates said electrical energy to the at least one power draining device and uses said power transmitter to transmit said electrical energy to the at least one power draining device.

2. The wireless energy network system of claim 1, wherein said power transmitter converts said electrical energy, which is harvested by the at least one energy harvesting device, into radio waves before being transmitted, and
    wherein the power receiver intercepts said radio waves and converts said radio waves back into said electrical energy for consumption by the at least one power draining device.

3. The wireless energy network system of claim 2, wherein the power transmitter and the power receiver each include an omnidirectional antenna.

4. The wireless energy network system of claim 2, wherein the power transmitter and the power receiver each include a directional antenna.

5. The wireless energy network system of claim 1, wherein the first transceiver and the second transceiver use at least one of Bluetooth technology, ANT technology, or ZigBee technology.

6. The wireless energy network system of claim 1, wherein the at least one energy harvesting device includes a harvesting mechanism to harvest electrical energy from the at least one external source by converting different forms of energy into said electrical energy.

7. The wireless energy network system of claim 6, wherein the harvesting mechanism comprises at least one of:
- a generator which converts rotational motion into said electrical energy;
- a piezoelectric generator which converts mechanical energy into said electrical energy, said piezoelectric generator produces voltage differential when a deformation is detected by the piezoelectric generator;
- a thermoelectric generator or a Peltier element, which converts thermal energy into said electrical energy, the thermoelectric generator or the Peltier element being configured to generate power from a temperature difference;
- a vibration-powered generator or a piezoelectric element, which converts kinetic energy of shocks and vibrations into said electrical energy;
- inductive coils, which generates said electrical energy by moving a magnet through said inductive coils, thereby inducing a current; or
- a device utilizing triboelectric effect to create said electrical energy when two dissimilar materials contact one another.

8. The wireless energy network system of claim 7, wherein the at least one energy harvesting device is a ball, the generator of the harvesting mechanism harnessing kinetic energy from rotation of the ball and converting the kinetic energy into said electrical energy.

9. The wireless energy network system of claim 6, wherein the at least one energy harvesting device includes a first controller configured to control the harvesting mechanism, and in response to the first transceiver receiving the request signal, the first controller transfers the electrical energy from the harvesting mechanism to the power transmitter to be wirelessly transmitted to the at least one power draining device; and
- wherein the at least one power draining device includes a second controller configured to monitor a power status of the at least one power draining device and configured to generate the request signal when the power status meets a threshold requirement.

10. The wireless energy network system of claim 9, wherein the second controller is configured to compile power data of the at least one power draining device and send said power data to the at least one energy harvesting device; and
- wherein the first controller utilizes the power data to prioritize wireless transmission of said electrical energy to one device of said at least one power draining device relative to other devices of said at least one power draining device.

11. The wireless energy network system of claim 10, wherein the power data from the second controller includes an amount of power that said at least one power draining device needs; and
- wherein the first controller compares the amount of power with power data of said at least one energy harvesting device to determine if said at least one energy harvesting device has a quantity of said electrical energy that meets the amount of power needed by said at least one power draining device.

12. The wireless energy network system of claim 9, wherein said first controller includes a regulator to regulate current flow in said at least one energy harvesting device.

13. The wireless energy network system of claim 9, wherein said first controller includes an amplifier to boost a voltage of said electrical energy harvested by the harvesting mechanism before being transmitted to said at least one power draining device.

14. The wireless energy network system of claim 9, wherein said at least one energy harvesting device and said at least one power draining device each include a GPS module to provide position information;
- wherein the first controller uses the position information of said at least one power draining device and the position information of said at least one energy harvesting device to calculate a distance and direction from said at least one energy harvesting device to said at least one power draining device; and
- wherein the first controller uses the calculated distance and direction to configure the power transmitter.

15. The wireless energy network system of claim 1, wherein the at least one energy harvesting device includes a first battery to store said electrical energy prior to being wirelessly transmitted to the at least one power draining device, and
- wherein the at least one power draining device includes a second battery to store said electrical energy after being wirelessly received by the power receiver.

16. The wireless energy network system of claim 1, further comprising at least one intermediate node in the wireless mesh network, the intermediate node interconnecting the at least one energy harvesting device and the at least one power draining device and being configured to relay communications between the at least one energy harvesting device and the at least one power draining device.

17. The wireless energy network system of claim 16, wherein the at least one intermediate node is configured to relay said electrical energy from the power transmitter to the power receiver.

18. A wireless energy network system comprising:
- a plurality of energy harvesting devices each configured to harvest electrical energy from at least one external source, each energy harvesting device having a first transceiver for communication, a power transmitter configured to convert said electrical energy into radio waves and wirelessly transmit said radio waves, and a first controller configured to control transfer of said electrical energy to the power transmitter and conversion of said electrical energy;
- a plurality of power draining devices each having a second transceiver which is communicatively connected to the first transceivers of the plurality of energy harvesting devices via a wireless mesh network, each power draining device having a power receiver configured to wirelessly receive said electrical energy of one or more of said plurality of energy harvesting devices, each power draining device having a second controller configured to monitor a power status of the power draining device and to generate a request signal when the power status meets a threshold requirement;
- one device of said plurality of power draining devices generating said request signal which indicates that said one device requires power to maintain functional operation, the request signal being communicated from said one device over the wireless mesh network and received by one of said plurality of energy harvesting devices;
- wherein, upon receiving the request signal, said one of said plurality of energy harvesting devices dynamically allocates said electrical energy to said one device and uses said power transmitter to transmit said electrical energy to said one device.

19. The wireless energy network system of claim 18, wherein said one device receives power from a group of said plurality of energy harvesting devices.

20. The wireless energy network system of claim 18, wherein two or more devices of said plurality of power draining devices generate said request signals, the request signals being communicated from said two or more devices over the wireless mesh network and received by said one of said plurality of energy harvesting devices; and wherein said one of said plurality of energy harvesting devices wirelessly transmits said electrical energy to said two or more devices of said plurality of power draining devices.

21. A method of wirelessly transmitting electrical energy over a wireless mesh network having at least one energy harvesting device and at least one power draining device, said method comprising the steps of:

sending power data of said power draining device to said energy harvesting device via a first transceiver of said energy harvesting device and a second transceiver of said power draining device;

using said power data to determine, via a first controller in said energy harvesting device, how much electrical energy said power draining device needs to maintain functional operation;

collecting said electrical energy using a harvesting mechanism in said energy harvesting device, said harvesting mechanism being configured to harvest said electrical energy from an external source by converting different forms of energy into electrical energy;

transferring said electrical energy from said harvesting mechanism to a power transmitter of said energy harvesting device;

transmitting wirelessly said electrical energy using said power transmitter and receiving said electrical energy using a power receiver in said power draining device;

transferring said electrical energy received by said power receiver to a second controller of said power draining device; and processing, via the second controller, said electrical energy received by said power receiver into form usable by the power draining device.

22. The method of claim 21, wherein said step of transmitting wirelessly said electrical energy comprises converting said electrical energy into radio waves and radiating said radio waves via said power transmitter; and wherein said step of receiving said electrical energy comprises receiving said radio waves and converting said radio waves back into said electrical energy.

23. The method of claim 21, wherein said energy harvesting data is configured to receive power data of multiple power draining devices; and wherein said method further comprises the steps of:

using said power data to organize said multiple power draining devices into groups based on power needs of each one of said multiple power draining devices and signal strength of each one of said multiple power draining devices; and determining, on a basis of said groups, an order in which said energy harvesting device wirelessly transmits said electrical energy to said multiple power draining devices.

24. The method of claim 23, wherein said order provides for those of said multiple power draining devices requiring high power emission to have priority in receiving said electrical energy over those of said multiple power draining devices requiring medium power emission or low power emission.

25. The method of claim 21, further comprising the steps of:

determining, via said second controller, if said power draining device is fully charged;

sending a confirmation signal to said first controller, said confirmation signal being indicative of said power draining device being fully charged; and upon receipt of said confirmation signal by said first controller, ending wireless transmission of said electrical energy to said power draining device;

wherein, after ending said wireless transmission, said energy harvesting device is configured to operate as a power draining device.

* * * * *